US012793530B2

(12) United States Patent
Goutsos et al.

(10) Patent No.: US 12,793,530 B2
(45) Date of Patent: Nov. 10, 2026

(54) INCIDENT INFORMATION HANDLING

(71) Applicant: Drager Safety AG & Co. KGaA, Lübeck (DE)

(72) Inventors: Konstantinos Goutsos, Newcastle upon Tyne (GB); Thomas Eric Vardy, Howden (GB); Dainius Narsutis, Northumberland (GB)

(73) Assignee: Dräger Safety AG & Co. KGaA, Lübeck (DE)

( * ) Notice: Subject to any disclaimer, the term of this patent is extended or adjusted under 35 U.S.C. 154(b) by 0 days.

(21) Appl. No.: 19/048,148

(22) Filed: Feb. 7, 2025

(65) Prior Publication Data

US 2025/0259529 A1 Aug. 14, 2025

(30) Foreign Application Priority Data

Feb. 8, 2024 (EP) .................................... 24386013

(51) Int. Cl.
*G08B 25/00* (2006.01)
*G08B 21/02* (2006.01)
*G08B 25/01* (2006.01)
*G08B 25/10* (2006.01)

(52) U.S. Cl.
CPC ........... *G08B 25/009* (2013.01); *G08B 21/02* (2013.01); *G08B 25/016* (2013.01); *G08B 25/10* (2013.01)

(58) Field of Classification Search
None
See application file for complete search history.

(56) References Cited

U.S. PATENT DOCUMENTS

| | | | | |
|---|---|---|---|---|
| 11,722,807 | B2 | 8/2023 | Kloc et al. | |
| 12,489,569 | B2 * | 12/2025 | Bhaskaran | H04W 24/04 |
| 2006/0025122 | A1 * | 2/2006 | Harris | H04W 4/16 455/414.3 |
| 2008/0205315 | A1 * | 8/2008 | Park | H04W 76/34 370/310 |
| 2011/0140913 | A1 | 6/2011 | Montenero | |
| 2013/0078908 | A1 | 3/2013 | Smith | |
| 2013/0197951 | A1 | 8/2013 | Watson et al. | |
| 2021/0014157 | A1 * | 1/2021 | Zhou | H04L 43/18 |
| 2022/0335809 | A1 | 10/2022 | Shannon et al. | |
| 2023/0116548 | A1 * | 4/2023 | Hao | H04L 45/28 370/216 |
| 2023/0217141 | A1 | 7/2023 | Kloc et al. | |
| 2024/0195543 | A1 * | 6/2024 | Bhaskaran | H04L 5/0048 |

OTHER PUBLICATIONS

European Patent Office, "Extended European Search Report," Issued in connection with European Patent Application No. 24386013.7, on Jun. 26, 2024, 9 pages.

* cited by examiner

*Primary Examiner* — Carlos Garcia
(74) *Attorney, Agent, or Firm* — Banner & Witcoff, Ltd.

(57) ABSTRACT

There is provided a method for handling incident information in a network. The incident information may be associated with an emergency response incident. The method may be performed by a base station of the network. The base station may be configured to route communications between a wireless device and a breathing apparatus of the network. The method may comprise receiving the incident information from a first wireless device via a first connection. The method may further comprise, in response to determining an error of the first connection, releasing the first connection, and identifying a second wireless device of the network that is configured to receive the incident information.

20 Claims, 4 Drawing Sheets

INCIDENT INFORMATION HANDLING

CROSS-REFERENCE TO RELATED APPLICATIONS

This application claims the priority of European Patent Application No. 24386013.7, filed on Feb. 8, 2024, and titled "INCIDENT INFORMATION HANDLING", which is hereby incorporated by reference in its entirety for all nonlimiting purposes.

TECHNICAL FIELD

The present disclosure relates to incident information handling and, more specifically, to methods and apparatus for handling incident information associated with an emergency response incident.

BACKGROUND

Emergency services (e.g. fire services) are organisations that ensure public safety, security and health by addressing and resolving different emergencies. As such, emergency services require every advantage possible when dealing with emergency response incidents. This is especially true as emergency services are required to respond to increasingly more complex incidents. Indeed, an emergency response incident can involve many individuals, including both responders and members of the public, and responders are commonly equipped with specialised equipment which must be carefully monitored and maintained in order to provide safety for the responders. For example, fire services regularly deal with toxic environments created by combustible materials, resulting in smoke, oxygen deficiency, elevated temperatures, poisonous atmospheres, and violent air flows. To combat some of these risks, firefighters carry breathing apparatus (BA). The proper management of such specialised equipment can mean the difference between a successful incident outcome and disaster.

Moreover, emergency services must be ready to adapt to an array of different environments (e.g. both natural and man-made), which cause further challenges with organising and effectively dealing with an incident. As such, ineffective management of such incidents can cause serious harm to the public and result in irreparable damage to infrastructure.

In the past, emergency services (e.g. fire services) have relied on analogue tools to monitor and control the handling of emergency response incidents. For example, an entry control operative (ECO) will commonly use a physical board (e.g. an entry control board (ECB)) for keeping track of fire fighters deployed at an incident (e.g. a building fire). In such a scenario, the ECO monitors the incident by physically organising the board with the help of "tallies", which visibly show the name of the fire fighter being deployed at the incident and the time at which said fire fighter entered the incident. Thus, the tallies can be physical elements which are added and removed from the board to allow the ECO to keep track of the personnel deployed at an incident. The addition of a physical tally to the board can act as an incident registration for the corresponding firefighter. In addition to the physical board, the ECO commonly utilises walkie-talkies to manually control the incident and receive updates on the condition of personnel.

In recent years, some emergency services have adopted telemetry techniques which provide for enhanced communication between the personnel deployed at an incident. Specifically, emergency services personnel can be provided with equipment which enables (e.g. wireless) communication with other personnel and provides for the sharing of information describing the status of a wearer of said equipment, and of the equipment itself. As such, emergency services personnel can be provided with equipment that enables the transmission of vital information in real time to an ECO, which gives the ECO more time to make tactical, and potentially lifesaving decisions. Therefore, techniques utilising enhanced communication provide a significant advantage for the overall safety of individuals involved in the incident and provides greater reassurance for responders during a deployment.

Similar to the manual technique of using a physical board for keeping track of an incident, techniques utilising enhanced communication also require an ECO to perform an initial set up of an incident. That is, the ECO must register the emergency personnel deployed at the incident, before being able to actively monitor their status and the status of their equipment during the incident. However, there exist certain challenges associated with current techniques for monitoring incidents. In particular, in the event that an ECO's equipment suffers a malfunction, or loses connectivity to the equipment used by personnel deployed at the incident, the incident loses the crucial benefit of central control and the incident data itself can be corrupted or lost. Such an event can be catastrophic for both the safety of the individuals involved in the incident and for the outcome of the incident. In other words, a loss of connection, or a malfunction, can result in the absence of tactical leadership which causes confusion and risks lives. In such a scenario, the ECO may have to actively troubleshoot the connectivity issue before being allowed to resume control of the incident. However, even a small amount of time between connection loss and recovery can be catastrophic for the safety of both responders and the public. In some cases, even if connection can be resumed for the ECO's equipment, the incident information is lost as a result. In cases such as these, it may take the ECO an unacceptable amount of time to re-configure the incident, and the risk of improperly configuring the incident (e.g. due to simple human error) can cost lives.

SUMMARY

As mentioned above, there are challenges associated with existing techniques for handling emergency response incidents which jeopardise the safety of emergency services personnel and members of the public involved in the incident. It would thus be valuable to have an improvement aimed at addressing these challenges.

Therefore, according to a first aspect of the disclosure, there is provided a method for handling incident information in a network. The incident information is associated with an emergency response incident. The method is performed by a base station of the network and the base station is configured to route communications between a wireless device and a breathing apparatus of the network. The method comprises receiving the incident information from a first wireless device via a first connection. The method also comprises, in response to determining an error of the first connection, releasing the first connection, and identifying a second wireless device of the network that is configured to receive the incident information.

According to a second aspect of the disclosure, there is provided a base station comprising processing circuitry configured to operate in accordance with the method described herein.

According to a third aspect of the disclosure, there is provided a computer program product, embodied on a non-transitory machine-readable medium. The computer program product comprises instructions which are executable by processing circuitry to cause the processing circuitry to perform the method described herein.

There are thus provided improved techniques for handling incident information in a network. The techniques are improved since a user of the wireless device (e.g. a controller of the incident, such as an ECO) is not required to actively re-configure an active incident on a different wireless device. In this way, incident information can be recovered more quickly which reduces the amount of time in which the incident is uncontrolled, and thus reduces the risk of harm for individuals involved in the incident. Moreover, the techniques remove the need for a user (e.g. a controller of the incident) to manually re-configure an incident session. As mentioned earlier, such a re-configuration can result in error which can be catastrophic for the safety of emergency responders. For example, even a minor error in the input of a start time associated with a responder entering an incident can lead to serious harm or even death for said responder. Furthermore, the techniques described herein remove unwanted distraction from the role of a controller in the event of a device malfunction or loss of connectivity, and thus enable the controller to apply greater focus to the successful management of the incident.

BRIEF DESCRIPTION OF THE DRAWINGS

Exemplary embodiments will now be described, by way of example only, with reference to the following drawings, in which.

DETAILED DESCRIPTION

Figure 1:
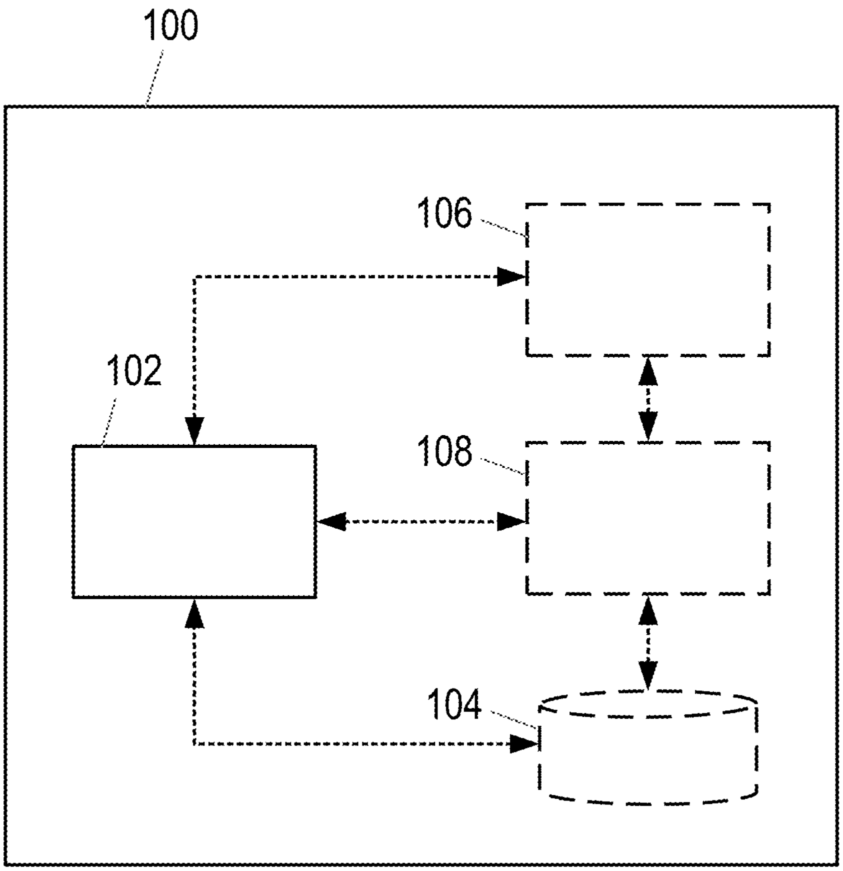
FIG. 1 is a schematic illustration of a base station according to some embodiments.

Some of the embodiments contemplated herein will now be described more fully with reference to the accompanying drawings. Other embodiments, however, are contained within the scope of the subject-matter disclosed herein, the disclosed subject-matter should not be construed as limited to only the embodiments set forth herein; rather, these embodiments are provided by way of example to convey the scope of the subject-matter to those skilled in the art.

As mentioned above there is provided herein a technique for handling incident information in a network. The incident information is associated with an emergency response incident.

Herein an emergency response incident may be any type of emergency response incident. More specifically, an emergency response incident may be any incident which involves the addressing and/or resolving of an emergency. An emergency, as referred to herein, can be an urgent, unexpected and/or dangerous situation that poses an immediate risk to health, life, property and/or environment. An emergency may require urgent intervention to prevent a worsening of the situation. Examples of the emergency response incident referred to herein include, but are not limited to, incidents which pose a danger to life, a danger to health, and/or a danger to the environment. For example, the emergency response incident referred to herein may include a fire related incident (e.g. a building fire, a forest fire, a car fire, etc.). Alternatively, or in addition, the emergency response incident referred to herein may involve hazardous material operations (e.g. dealing with substances which are a risk to health, safety, property, and/or the environment).

The incident information described herein may be any type of incident information associated with an emergency response incident as defined herein. For example, the incident information may comprise, but is not limited to, information indicative of a status of the incident, a location of the incident, incident alert information, evacuation information, personnel information, etc. The incident information may, for example, comprise information indicative of one or more BAs and/or one or more respective wearers of the one or more BAs. The incident information can comprise information indicative of a physical status and/or a health status of personnel deployed at the incident (e.g. the one or more wearers of the one or more BAs).

The method described herein is performed by a base station of a network. The base station referred to herein is configured to route communications between a wireless device and a BA. Herein, the base station can be any entity of the network which is configured to act as a transceiver between a wireless device and a BA. Thus, in some examples, the base station referred to herein may be configured to operate as a repeater device between different entities of the network referred to herein. The base station referred to herein can be configured to receive communications from the wireless device and/or the BA. The base station referred to herein can be configured to initiate transmission of information towards the wireless device and/or the BA. Herein, the term "initiate" can mean, for example, cause or establish. Thus, any reference to an entity (e.g. the base station) "initiating transmission" will be understood to mean that the entity (e.g. the processing circuitry of the entity) can be configured to itself transmit (e.g. via a communications interface of the entity) or can be configured to cause another entity to transmit. The base station can be referred to herein as a "hub" (e.g. of the network).

The techniques described herein can be used in respect of any network, such as any communications or telecommunications network, e.g. cellular network. The network referred to herein may be a radio network. For example, the network referred to herein may be a 2.4 GHz radio network. In some examples, the network may comprise a Wi-Fi network (e.g. based on the Institute of Electrical and Electronics Engineers (IEEE) 802.11 family of standards). Alternatively, or in addition, the network may comprise a Bluetooth network (e.g. based on the IEEE 802.15.1 family of standards). Any one or more of the base station referred to herein, the wireless device referred to herein, and the base station referred to herein may communicate (e.g. directly or indirectly) via the network described herein.

The techniques described herein involve a breathing apparatus (BA). The breathing apparatus referred to herein can be configured to initiate transmission of information (e.g. signals) and/or receive information. For example, the BA referred to herein can be configured to initiate transmission of information towards the base station referred to herein. The BA referred to herein may be any type of BA. More specifically, the BA referred to herein may be any type of apparatus (e.g. device) which is worn by a wearer of the BA in order to provide a supply of breathable gas (e.g. air) to the wearer. As such, a BA can be advantageously utilised in an atmosphere that is immediately dangerous to life or health. In an example, the BA referred to herein may be a self-contained breathing apparatus (SCBA) and/or a compressed air breathing apparatus (CABA). The BA referred to herein may be a closed-circuit BA. Alternatively, the BA referred to herein may be an open-circuit BA.

The techniques described herein also involve a wireless device. The wireless device (e.g. a first wireless device as referred to herein and/or a second wireless device as referred to herein) may be any type of wireless device. More specifically, the wireless device referred to herein may be any device configured to communicate wirelessly with one or more other entities (e.g. of the network referred to herein, such as the base station). For example, the wireless device may be a user equipment (UE). The wireless device referred to herein can include, but is not limited to, a smart device such as a smartphone or a tablet. The wireless device can be configured to run an application (or "app") which, for example, enables the wireless device to communicate with the base station. The application may provide a user of the wireless device (e.g. an ECO) with the ability to manage and/or control an incident as described herein. The wireless device may be configured to enable the user to create, edit and/or view incident information. For example, the wireless device may be configured to enable the user of the wireless device to view one or more BAs of the network (e.g. deployed at the incident). Alternatively, or in addition, the wireless device may be configured to enable the user of the wireless device to (re) configure the one or more BAs and/or the respective one or more wearers of the one or more BAs into groups (e.g. teams). The reconfiguration can comprise, for example, assigning and/or removing a BA, and/or a wearer of the BA, to and/or from a group respectively. The wireless device can be configured to initiate transmission of incident information (e.g. configuration of one or more BAs) towards the base station. As such, the incident can be controlled and managed (e.g. centrally) using the wireless device.

FIG. 1 illustrates a base station 100 according to an embodiment. The base station 100 can be for handling incident information in a network.

As illustrated in FIG. 1, the base station 100 comprises processing circuitry (or logic) 102. The processing circuitry 102 controls the operation of the base station 100 and can implement the method described herein in respect of the base station 100. The processing circuitry 102 can be configured or programmed to control the base station 100 in the manner described herein.

The processing circuitry 102 can comprise one or more hardware components, such as one or more processors (e.g. one or more microprocessors, one or more multi-core processors, and/or one or more digital signal processors (DSPs)), one or more processing units, one or more processing modules, and/or one or more controllers (e.g. one or more microcontrollers). The one or more hardware components can be arranged on one or more printed circuit board assemblies (PCBAs) contained in one or more housing components. The one or more hardware components may be configured or programmed (e.g. using software or computer program code) to perform the various functions described herein in respect of the base station 100. In particular implementations, each of the one or more hardware components can be configured to perform, or is for performing, individual or multiple steps of the method described herein in respect of the base station 100. The processing circuitry 102 can be configured to run software to perform the method described herein in respect of the base station 100. The processing circuitry 102 can thus be implemented in numerous ways, with software and/or hardware, to perform the various functions described herein in respect of the base station 100.

Briefly, the processing circuitry 102 of the base station 100 is configured to receive the incident information from a first wireless device via a first connection. The processing circuitry 102 of the base station 100 is also configured to, in response to determining an error of the first connection, release the first connection, and identify a second wireless device of the network that is configured to receive the incident information.

As illustrated in FIG. 1, the base station 100 may optionally comprise a memory 104. Alternatively, the memory 104 may be external to (e.g. separate to or remote from) the base station 100. The memory 104 may comprise any type of non-transitory machine-readable medium, such as at least one cache or system memory. The memory 104 may comprise a volatile or a non-volatile memory. Examples of the memory 104 include, but are not limited to, a random access memory (RAM), a static RAM (SRAM), a dynamic RAM (DRAM), a read-only memory (ROM), a programmable ROM (PROM), an erasable PROM (EPROM), and an electrically erasable PROM (EEPROM), and/or any other memory.

The processing circuitry 102 can be communicatively coupled (e.g. connected) to the memory 104. The processing circuitry 102 may be configured to communicate with and/or connect to the memory 104. The memory 104 may be for storing program code or instructions which, when executed by the processing circuitry 102, cause the base station 100 to operate in the manner described herein. For example, the memory 104 may be configured to store program code or instructions that can be executed by the processing circuitry 102 to cause the base station 100 to operate in accordance with the method described herein in respect of the base station 100. Alternatively or in addition, the memory 104 can be configured to store any information, data, messages, requests, responses, indications, notifications, signals, or similar, that are described herein. The processing circuitry 102 may be configured to control the memory 104 to store information, data, messages, requests, responses, indications, notifications, signals, or similar, that are described herein.

As illustrated in FIG. 1, the base station 100 may optionally comprise a user interface 106. The user interface 106 can be configured to render (or output, display, or provide) information required by or resulting from the method described herein. For example, the user interface 106 may be configured to render (or output, display, or provide) any information, data, messages, requests, responses, indications, notifications, signals, or similar, that are described herein. Alternatively or in addition, the user interface 106 can be configured to receive a user input. For example, the user interface 106 may allow a user to manually enter information or instructions, interact with, and/or control the base station 100. Thus, the user interface 106 may be a user interface that enables the rendering (or outputting, displaying, or providing) of information and/or that enables a user to provide a user input. For example, the user interface 106 may be configured to display incident information indicative of an evacuation order for personnel deployed at the incident.

The user interface 106 may comprise one or more components for rendering information and/or one or more components that enable the user to provide a user input. The one or more components for rendering information can comprise one or more visual components (e.g. a display or display screen, a graphical user interface (GUI) such as a touch screen, one or more lights such one or more light emitting diodes (LEDs), and/or any other visual component), one or more audio components (e.g. one or more speakers, and/or any other audio component), and/or one or more tactile/haptic components (e.g. a vibration function, or any other haptic/tactile feedback component), or any other user interface, or combination of user interfaces. The one or more components that enable the user to provide a user input can comprise one or more visual components (e.g. one or more switches, one or more buttons, a keypad, a keyboard, a mouse, a graphical user interface (GUI) such as a touch screen, and/or any other visual component), and/or one or more audio components (e.g. one or more microphones, and/or any other audio component), and/or one or more tactile/haptic components (e.g. a vibration function, or any other haptic/tactile feedback component), or any other user interface, or combination of user interfaces.

As illustrated in FIG. 1, the base station 100 may optionally comprise a communications interface (or communications circuitry) 108. The communications interface 108 can be communicatively coupled (e.g. connected) to the processing circuitry 102, the memory 104, and/or the user interface 106. Although the communications interface 108 and the user interface 106 are illustrated as separate interfaces, in other embodiments, the communications interface 108 may be part of the user interface 106. The processing circuitry 102 may be configured to communicate with and/or connect to the communications interface 108. In some embodiments, the processing circuitry 102 can be configured to control the communications interface 108 to operate in the manner described herein. The communications interface 108 can be for enabling the base station 100, or components of the base station 100 (e.g. the processing circuitry 102, the memory 104, the user interface 106, and/or any other components of the base station 100), to communicate with and/or connect to each other and/or one or more other components.

For example, the communications interface 108 may be operable to allow the processing circuitry 102 to communicate with and/or connect to the memory 104 and/or vice versa. Similarly, the communications interface 108 may be operable to allow the processing circuitry 102 to communicate with and/or connect to the user interface 106 and/or vice versa. Similarly, the communications interface 108 may be operable to allow the processing circuitry 102 to communicate with and/or connect to any one or more other entities (e.g. any one or more of the BA, the first wireless device, the second wireless device, or any other entity) referred to herein. The communications interface 108 can be configured to transmit and/or receive information, data, messages, requests, responses, indications, notifications, signals, or similar, that are described herein. The processing circuitry 102 may be configured to control the communications interface 108 to transmit and/or receive information, data, messages, requests, responses, indications, notifications, signals, or similar, that are described herein.

The communications interface 108 may enable the base station 100, or components of the base station 100, to communicate and/or connect in any suitable way. For example, the communications interface 108 may enable the base station 100, or components of the base station 100, to communicate and/or connect wirelessly, via a wired connection, or via any other communication (or data transfer) mechanism. In some wireless implementations, for example, the communications interface 108 may enable the base station 100, or components of the base station 100, to use radio frequency (RF), Wi-Fi, Bluetooth, or any other wireless communication technology to communicate and/or connect. In some examples, the communications interface 108 may comprise a proprietary radio module.

Although the base station 100 is illustrated in FIG. 1 as comprising a single memory 104, it will be appreciated that the base station 100 may comprise at least one memory (i.e. a single memory or a plurality of memories) 104 that operate in the manner described herein. Similarly, although the base station 100 is illustrated in FIG. 1 as comprising a single user interface 106, it will be appreciated that the base station 100 may comprise at least one user interface (i.e. a single user interface or a plurality of user interfaces) 106 that operate in the manner described herein. Similarly, although the base station 100 is illustrated in FIG. 1 as comprising a single communications interface 108, it will be appreciated that the base station 100 may comprise at least one communications interface (i.e. a single communications interface or a plurality of communications interfaces) 108 that operate in the manner described herein. It will also be appreciated that FIG. 1 only shows the components required to illustrate an embodiment of the base station 100 and, in practical implementations, the base station 100 may comprise additional or alternative components to those shown.

Figure 2:
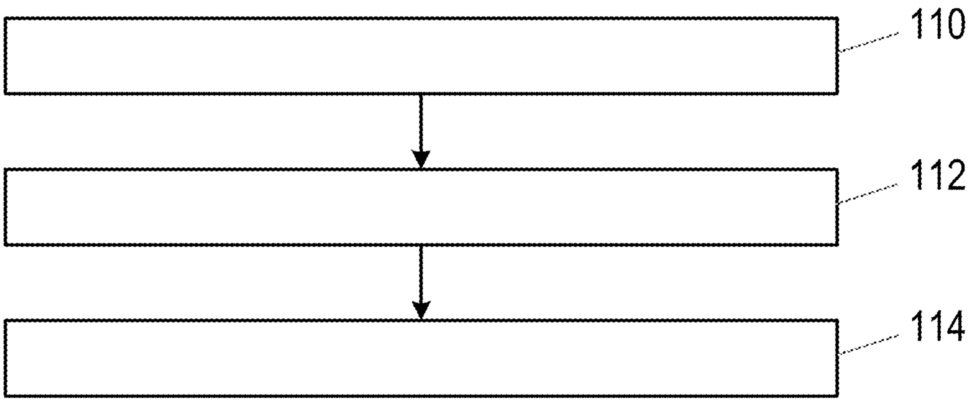
FIG. 2 is a block diagram illustrating a method according to some embodiments.

FIG. 2 illustrates a method according to an embodiment. The method is for handling incident information. The base station 100 described earlier with reference to FIG. 1 can be configured to operate in accordance with the method. For example, the method can be performed by or under the control of the processing circuitry 102 of the base station 100. The method described herein may be a computer-implemented method.

With reference to FIG. 2, at block 110, incident information is received from a first wireless device via a first connection. More specifically, the base station 100 (e.g. the processing circuitry 102 of the base station 100) receives the incident information from the first wireless device via the first connection (e.g. via the communications interface 108 of the base station 100). The incident information is associated with an emergency response incident.

The incident information may comprise, for example, any one or more of a start time of the incident, a location of the incident, an identifier associated with the first wireless device, an identifier indicative of an identity of a wearer of the BA, a status of the wearer of the BA, and measurement information associated with the BA. For example, the incident may comprise an incident name, a start date and/or time for the incident, a (e.g. geographical) location for the incident, and/or an identifier of a user of the first wireless device (e.g. an ECO identity ID). As described herein, the incident may involve one or more personnel (e.g. one or more wearers of one or more respective BAs). The one or more personnel may comprise, for example, a fire fighter. The one or more personnel may be divided (e.g. assigned by the user of the first wireless device) into one or more groups (or teams). As such, in some examples, the incident information may comprise group (or team) information associated with the one or more personnel, such as a group identifier, radio channel information, and/or a (e.g. current) status of the group. The status of the wearer of the BA can be indicative of a group (or team) to which the wearer of the BA belongs. Alternatively, or in addition, the incident information may comprise information indicative of which personnel are assigned to which group, and/or an identity of a group lead. In some examples, the incident information may comprise one or more notes about the incident (e.g. created by a user (e.g. ECO) of the first wireless device). The incident information may comprise various types of media. For example, the incident information may comprise one or more of text, images (e.g. photos), voice notes created during the incident (e.g. by a user (e.g. ECO) of the first wireless device).

In some examples, the incident information may comprise information indicative of which of the one or more personnel are deployed at the incident (e.g. actively engaged in the incident) and/or information indicative of which of the one or more personnel are on standby (e.g. ready (waiting) to be deployed to the incident). The incident information may comprise information indicative of a status of a wearer of the BA. For example, the incident information may comprise information indicative of an (e.g. thermal and/or movement) alert associated with the wearer of the BA and/or information indicative that the wearer of the BA has acknowledged an alert (e.g. indicative of a request to leave the incident). In some examples, the incident information may comprise evacuation information, such as an evacuation signal indicative that some or all of the personnel deployed at the incident are requested to evacuate the incident. A request to evacuate the incident may be transmitted in the event that the incident poses a significant risk to life and/or health. For example, a request to evacuate may be transmitted in the event that a (e.g. burning) building involved in the incident is likely to collapse. In some examples, the incident information may comprise information indicative of a loss of connection to the BA. For example, the incident information may comprise information indicative that the BA has gone out of range of the base station 100. In such a scenario, the BA may not be able to communicate with either the base station 100 or the first wireless device (e.g. via the base station 100). The incident information may comprise measurements associated with the BA. For example, the incident information may comprise information indicative of a (e.g. gas) pressure measurement of the BA. The pressure measurement of the BA can indicate a remaining operational capacity of the BA. Herein, information generated and/or obtained from the BA can be referred to as "telemetry information".

At block 112 of FIG. 2, in response to determining that an error of the first connection has occurred, the first connection is released. More specifically, the base station 100 (e.g. the processing circuitry 102 of the base station 100) releases the first connection in response to the error being determined. Releasing the first connection may comprise terminating the first connection. For example, releasing the first connection may comprise terminating any connection that the base station 100 has (e.g. established) with the first wireless device. In some examples, releasing the first connection may comprise releasing a media access control (MAC) address associated with the first wireless device. The MAC address associated with the first wireless device may be (e.g. previously) assigned to the base station 100. The base station 100 may obtain the MAC address associated with the first wireless device (e.g. prior to receiving the incident information from the first wireless device). The method described herein may comprise storing (e.g. via the memory 104 of the base station) the MAC address associated with the first wireless device.

In some examples, the method comprises determining that the error of the first connection has occurred. More specifically, the base station 100 (e.g. the processing circuitry 102 of the base station 100) can determine that the error has occurred. The error of the first connection may be determined to have occurred, for example, if a first period of time has elapsed in which no communication is received from the first wireless device. The first period of time may be (pre)configured using the first wireless device (e.g. by a user of the first wireless device). Alternatively, or in addition, the first period of time may be (pre)configured on the base station 100 (e.g. by storing a value for the first period of time in the memory 104 of the base station 100). The first period of time can be any suitable period of time, for example 1 s, 2 s, 5 s, 10 s, etc. The error of the first connection may be any type of error which causes an error of the first connection. For example, the error of the first connection may comprise the base station 100 losing connection with the first wireless device (e.g. by moving outside a connectivity range of the first wireless device). In some examples, the error of the first connection may comprise the application running in the first wireless device, as described herein, failing and/or malfunctioning. Alternatively, or in addition, the error of the first connection may comprise the first wireless device itself experiencing (e.g. hardware and/or software) failure. For example, the first wireless device may become damaged, and/or a power source (e.g. a battery) of the first wireless device may become depleted.

At block 114 of FIG. 2, in response to determining that the error of the first connection has occurred, a second wireless device of the network that is configured to receive the incident information is identified. More specifically, the base station 100 (e.g. the processing circuitry of the base station 100) performs this identification. In some examples, identifying the second wireless device may comprise checking for the presence of the second wireless device in the network.

In some examples, identifying the second wireless device may comprise receiving, from the second wireless device, a request for information indicative of a status of the incident. The request may comprise, for example, an identifier of the second wireless device. The identifier can be a MAC address associated with the second wireless device.

In some examples, the second wireless device may (e.g. only) be configured to receive the incident information if the second wireless device meets a qualification criterion. The qualification criterion may comprise, for example, that the second wireless device is configured to run the same application, as described herein, as the first wireless device. Alternatively, or in addition, the qualification criterion may comprise a (e.g. cryptographic) key. In some examples, information indicative of the qualification criterion may be (e.g. previously) stored on the base station 100 (e.g. via the memory 104 of the base station 100) and/or received by the base station 100 from the second wireless device (e.g. via the communications interface 106 of the base station 100). As such, in some examples, the base station 100 can have knowledge of which wireless devices are configured to receive the incident information (e.g. prior to the occurrence of the error of the first connection). In some examples, the information indicative of the qualification criterion may be comprised in the request for information indicative of the status of the incident.

Although not illustrated in FIG. 2, the method may comprise initiating transmission of the incident information towards the second wireless device via a second connection. More specifically, the base station 100 (e.g. the processing circuitry 102 of the base station 100) may be configured to initiate transmission of the incident information towards the second wireless device (e.g. via the communications interface 106 of the base station 100). As such, the incident information is recovered. In this way, the second wireless device is able to reconstruct the (e.g. configuration of) the incident based on the incident information received from the base station 100. Moreover, the second wireless device is then able to take over the management of the incident (e.g. including the configuration of the one or more personnel involved with the incident). As such, latency between the occurrence of the error of the first connection and the resumption of the management of the incident is reduced and the safety of the personnel is improved. Thus, the safety of personnel and the public involved in the incident is safeguarded from error.

The base station 100 may be configured to, at any one point in time, have a connection with only one of the first wireless device and the second wireless device. For example, the base station 100 may be configured to only be connected to a single one of the first wireless device and the second wireless device at any point in time. Therefore, in some examples, the base station 100 is configured to have a one-to-one connection with the wireless device that is used to control and/or manage the incident. Such a (e.g. one-to-one connection) configuration provides increased security and reliability. Advantageously, in such a case, during establishment of the first connection to the first wireless device, another device (e.g. the second wireless device) is unable to interfere with the operation of the base station 100 and the management of the incident. Thus, in some examples, the identification of the second wireless device, as described herein, may only occur after (e.g. in response to) the first connection is released (e.g. terminated).

The first wireless device and the second wireless device can be different. For example, the first wireless device can be a separate device to that of the second wireless device. In some examples, the first wireless device can be a user equipment (UE) comprising a display. Alternatively, or in addition, the second wireless device can be a UE comprising a display. As mentioned above, the network referred to herein may be a radio network (e.g. a Wi-Fi network). In some examples, the first connection and/or the second connection can comprise a Wi-Fi connection. In some examples, the BA can be an SCBA, as referred to herein.

There is also provided a system. the system can comprise any one or more of the base station 100 described herein, the BA described herein, the first wireless device described herein, and/or the second wireless device described herein.

Figure 3:
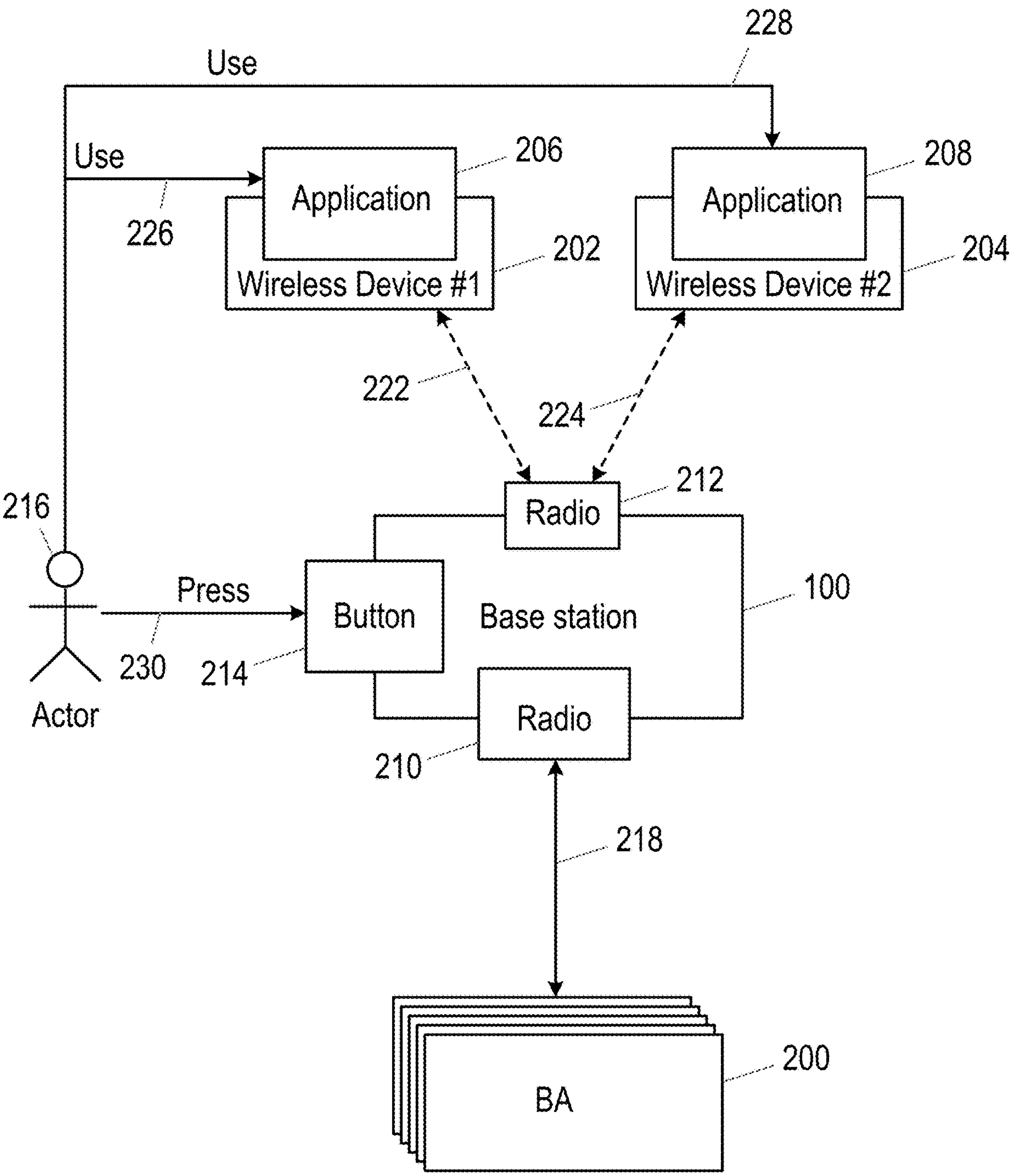
FIG. 3 is a schematic illustration of a system according to some embodiments.

FIG. 3 illustrates a system according to an embodiment. The system illustrated in FIG. 3 comprises a base station 100, a plurality of BAs 200, a first wireless device 202 ("Wireless Device #1"), and a second wireless device 204 ("Wireless Device #2"). Each of the base station 100, the plurality of BAs 200, the first wireless device 202 and the second wireless device 204 are of a network. The network can be a radio network. The network may comprise one or more entities (not illustrated in FIG. 3), such as a (e.g. cloud) server. In the system illustrated in FIG. 3, the base station 100 operates as described earlier with reference to FIGS. 1 and 2. The system illustrated in FIG. 3 may be referred to herein as a "telemetry system".

The system illustrated in FIG. 3 comprises a plurality of BAs 200, however it will be understood that this is merely an example and that, in other examples, the system may comprise any number of BAs (e.g. one or more).

As illustrated by block 206 of FIG. 3, an application can be run on the first wireless device 202. The application may be a (e.g. bespoke) software application. For example, the application can be for managing and/or controlling the incident as described herein. As illustrated by arrow 226 of FIG. 3, a user 216 can utilise the application running on the first wireless device 202 to make changes to an incident configuration, such as assigning and/or removing personnel (e.g. a fire fighter) from a team. In this way, the user 216 is able to configure one or more of the plurality of BAs 200 into groups (teams). In an example in which the emergency response incident involves a fire, the application may allow a user to see fire fighters in the area of the incident, set information about the fire fighters, and/or group fire fighters into teams, as part of the incident management process.

As illustrated by arrow 222 of FIG. 3, the base station receives incident information from the first wireless device 202 via a first connection. As also illustrated by arrow 222 of FIG. 3, the base station 100 can communicate with the first wireless device 202 via the first connection, and vice-versa. As illustrated by block 212 of FIG. 3, the first connection can be a radio (e.g. Wi-Fi) connection.

As illustrated by arrow 218 of FIG. 3, the base station 100 may receive communication(s) from one or more of the plurality of BAs 200. The base station 100 is configured to route communications between a BA (e.g. one or more of the BAs 200) and a wireless device (e.g. the first wireless device 202 and/or the second wireless device 204). As such, in the example illustrated in FIG. 3, the base station 100 can be configured to route communications from one or more of the BAs 200 to the first wireless device 202 and/or the second wireless device 204. In some examples, the base station 100 may be configured to perform parsing of information (e.g. data) received from a BA before transmitting the information towards a wireless device (e.g. the first wireless device 202 and/or the second wireless device 204). As such, the base station 100 may transmit, towards the first wireless device 202 and/or the second wireless device 204, a parsed version of the information received from the BAs 200. In some examples, the base station 100 may be configured to route (e.g. transmit) information received from a BA in response to receiving a request for the information from a wireless device (e.g. the first wireless device 202 and/or the second wireless device 204).

As illustrated by block 210 of FIG. 3, the communication (s) can be received by the base station 100 via (e.g. telemetry) radio. Communication(s) from a BA can comprise information indicative of the BA and/or of a wearer of the BA. For example, the information indicative of the BA may comprise (e.g. pressure) measurement information. Information indicative of the wearer of the BA may comprise, for example, a physical status (e.g. a movement status) of the wearer of the BA.

Although not explicitly illustrated in FIG. 3, an error of the first connection (illustrated by arrow 222) can occur. As described herein, in response to determining the error of the first connection, the first connection is released. As illustrated in FIG. 3, the second wireless device, that is configured to receive the incident information, is identified.

As illustrated by block 214 of FIG. 3, the base station 100 may comprise a user interface 214 (e.g., as illustrated by the label "Button"). As also illustrated in FIG. 3, the user interface may comprise a button. As illustrated by arrow 230 of FIG. 3, the base station may obtain an input (e.g. from the user 216). The user interface 214 may enable a user to manually release the first connection. Therefore, in some examples, in response to receiving an input (e.g. a button press from the user 216) via the user interface 214, the base station 100 may be configured to release the first connection. As such, the user 216 of the telemetry system can, for example, force release the first connection (e.g. release the MAC address associated with the first wireless device 202) by pressing a button (e.g. for a period of time) located on the base station 100. In this way, the base station 100 is configured with means to enable the user 216 to avoid having to wait for a (e.g. automatic) determination that an error of the first connection has occurred (e.g. expiration of a first period of time, as defined herein).

As illustrated by block 208 of FIG. 3, in some examples, the second wireless device 204 may run the same (e.g. bespoke) application as the first wireless device 208. In these examples, identifying the second wireless device 204 can comprise determining that the second wireless device 204 is configured to run the application. The determination can be based on information comprised in the request for information indicative of a status of the incident, as defined herein. As such, in some examples, the request can comprise information indicative that the second wireless device 204 is configured to run and/or is running the application.

As illustrated by arrow 224 of FIG. 3, the base station 100 can initiate transmission of the incident information towards the second wireless device via a second connection. Thus, the second wireless device 204 can receive the incident information from the base station 100. As illustrated by block 212 of FIG. 3, the second connection can be a radio (e.g. Wi-Fi) connection. As illustrated by arrow 228 of FIG. 3, the user can utilise the application running on the second wireless device in the manner as described with reference to arrow 226 of FIG. 3.

Figure 4:
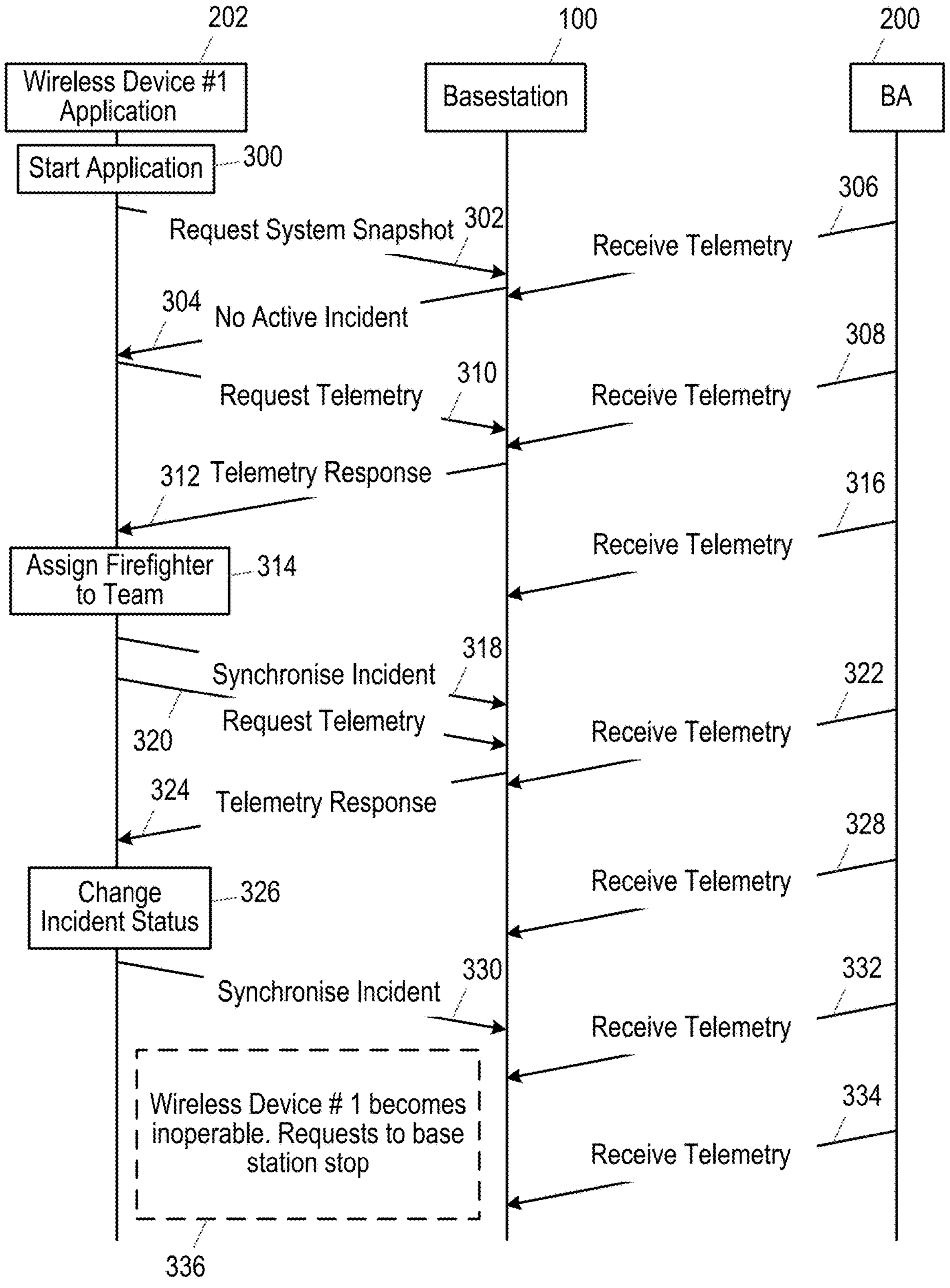
FIGS. 4 and 5 are signalling diagrams illustrating an exchange of signals in a network according to some embodiments.

FIG. 4 is a signalling diagram illustrating an exchange of signals in a system according to an embodiment. In more detail, FIG. 4 illustrates an exchange of signals in a system for handling incident information. The system illustrated in FIG. 4 comprises a base station 100, a BA 200, and a first wireless device 202 ("Wireless Device #1"). As illustrated in FIG. 4, the first wireless device 202 can be configured to run an application ("Application") as described herein.

In the system illustrated in FIG. 4, the base station 100 operates as the base station as described earlier with reference to FIGS. 1, 2 and 3. As illustrated by block 300 of FIG. 4, the first wireless device 202 may initiate (e.g. begin running) the application. The first wireless device 202 may, for example, initiate the application in response to a user input (e.g. an input via a touch screen display of the first wireless device 202). Although not illustrated in FIG. 4, in some examples, the base station 100 may establish a first connection to the first wireless device 202.

As illustrated by arrow 302 of FIG. 4, the first wireless device 202 may initiate transmission of a request message ("Request System Snapshot") towards the base station 100. The base station 100 can thus receive the request message from the first wireless device 202. The request message can comprise a request for a status of the incident. As illustrated by arrow 304 of FIG. 4, the base station 100 may initiate transmission of a response message ("No Active Incident") towards the first wireless device 202. The response message can comprise information indicative that no (e.g. active) incident has been established. In some examples, the base station 100 may determine that the incident has been established (e.g. started) in response to receiving a communication (e.g. a message and/or a signal) from the BA 200.

As illustrated by arrow 306 of FIG. 4, the BA 200 may transmit communication(s) to the base station 100, as described herein. Thus, the base station 100 may receive the communication(s) from the BA 200. As described herein, the base station 100 is configured to route communications between the BA 200 and the first wireless device 202. The steps corresponding to arrows 308, 316, 322, 328, 332, and 334 of FIG. 4 can each be as described with reference to arrow 306 of FIG. 4.

As illustrated by arrow 310 of FIG. 4, the first wireless device 202 may transmit a request for information about the incident to the base station. The base station 100 can thus receive the request for information from the first wireless device 202. As illustrated by arrow 312 of FIG. 4, the base station 100 may initiate transmission of a response message towards the first wireless device 202. The transmission of the response message can be performed in response to the request message as described with reference to arrow 310 of FIG. 4. Therefore, as described with reference to arrows 306, 308 and 312 of FIG. 4, the base station can route communications between the BA 200 and the first wireless device 202 (e.g. from the BA 200 to the first wireless device 202).

As illustrated by block 314 of FIG. 4, the first wireless device can configure incident information. As described herein, the incident information may comprise information indicative of a configuration of one or more personnel involved in the incident (e.g. the assignment of a fire fighter to a group (team)). The first wireless device 202 may perform the configuration of incident information in response to a (e.g. user) input. In these examples, a user of the first wireless device 202 is able to configure (e.g. generate and/or alter) incident information via the first wireless device 202. As illustrated by arrow 318 of FIG. 4, the first wireless device may transmit the incident information towards the base station 100 via the first connection. The base station 100 thus receives the incident information from the first wireless device 202 via the first connection, as described herein. The transmission and/or receipt of incident information, as described with reference to arrow 318 of FIG. 4, may be referred to herein as a (e.g. incident and/or incident information) synchronisation. Although not illustrated in FIG. 4, the some or all of the incident information received by the base station 100 can be transmitted (e.g. forwarded) to the BA 200. In this way, the base station 100 enables the first wireless device 202 to communicate with the BA 200 and, for example, provide one or more of information, commands, alerts, notifications, etc. to the BA 200.

The steps corresponding to arrows 320 and 324 of FIG. 4 can be as described with reference to arrows 310 and 312 of FIG. 4 respectively.

As illustrated by arrow 326 of FIG. 4, the first wireless device 202 can configure incident information (e.g. in a similar manner to that described with reference to arrow 314 of FIG. 4). For example, the incident information may comprise information indicative of a status of the incident. The status of the incident may be, for example, an evacuation status (e.g. indicating that the incident should be evacuated). The step corresponding to arrow 330 of FIG. 4 can be as described with reference to arrow 318 of FIG. 4.

As illustrated by block 336 of FIG. 4, an error of the first connection may occur. For example, as illustrated in FIG. 4, in some examples the error of the first connection may result from the first wireless device 202 becoming inoperable (e.g. due to power failure). The first wireless device 202 is unable to communicate with the base station 100 as a result of the error of the first connection.

Although not illustrated in FIG. 4, in response to determining the error of the first connection (e.g. has occurred), the base station 100 release the first connection. For example, the base station 100 can terminate the first connection. Although also not illustrated in FIG. 4, in response to determining the error of the first connection, the base station may initiate a process for identifying a second wireless device that is configured to receive the incident information. Some example steps of the method, as performed in relation to the second wireless device, are described with reference to FIG. 5 below.

Figure 5:
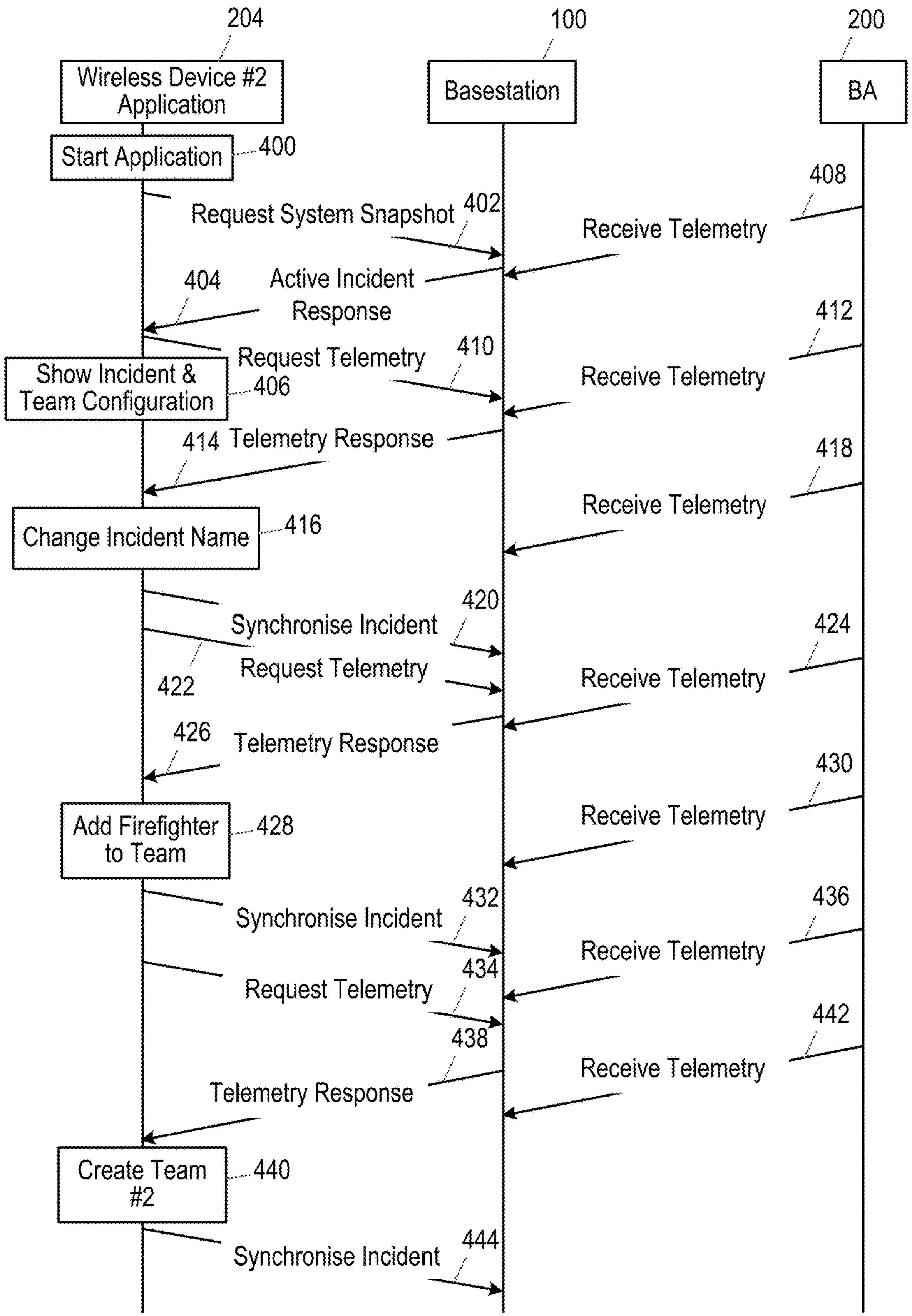

FIG. 5 is a signalling diagram illustrating an exchange of signals in a system according to an embodiment. In more detail, FIG. 5 illustrates an exchange of signals in a system for handling incident information. The system illustrated in FIG. 5 can be as described with reference to the system of FIG. 4, with the exception that the system illustrated in FIG. 5 comprises a second wireless device 204 ("Wireless Device #2") instead of the first wireless device 202 of the system illustrated in FIG. 4. The exchange of signals illustrated in FIG. 5 can take place after the exchange of signals as described with reference to FIG. 4. Therefore, the exchange of signals illustrated in FIG. 5 can occur after the occurrence of the error of the first connection, as described above with reference to block 336 of FIG. 4. In some examples, the exchange of signals illustrated in FIG. 5 can take place after a user has swapped wireless device (e.g. due to a fault occurrence) from the first wireless device 202 to the second wireless device 204.

As illustrated by block 400 of FIG. 5, the second wireless device 204 may initiate (e.g. begin running) an application. The application may be the same application as described with reference to block 300 of FIG. 4. The second wireless device 204 may, for example, initiate the application in response to a user input (e.g. an input via a touch screen display of the first wireless device 202).

As described herein, in response to determining the error of the first connection, the base station 100 identifies the second wireless device 204. The second wireless device 204 is configured to receive the incident information, as described herein. The second wireless device 204 may be configured to receive the incident information by virtue of the second wireless device 204 being configured to run the application (e.g. run by the first wireless device 202 as described with reference to FIG. 4). As illustrated by arrow 402 of FIG. 5, identifying the second wireless device 204 may comprise receiving, from the second wireless device 204, a request for information indicative of a status of the incident ("Request System Snapshot"). The information indicative of a status of the incident may be referred to herein as an "snapshot".

As illustrated by arrow 404 of FIG. 5, the base station 100 may initiate transmission of the incident information towards the second wireless device 204 via a second connection (between the base station 100 and the second network device 204). Therefore, the incident information may be recovered on the second wireless device 204 in response to the error of the first connection occurring. As also illustrated by arrow 404 of FIG. 5, the transmission of the incident information may be initiated in response to the request as described with reference to arrow 402 of FIG. 5.

As illustrated by block 406 of FIG. 5, the second wireless device 204 may output (e.g. a display of the wireless device 204) the incident information received from the base station 100. Thus, a user of the second wireless device 204 may be informed of the incident information (e.g. a status of the incident and/or information indicative of personnel deployed at the incident). As such, the user of the second wireless device 204 is able to quickly assume control of the incident.

As illustrated by arrow 408 of FIG. 5, the BA 200 may transmit communication(s) to the base station 100, as described herein. Thus, the base station 100 may receive the communication(s) from the BA 200. As described herein, the base station 100 is configured to route communications between the BA 200 and the second wireless device 204. The steps corresponding to arrows 412, 418, 424, 430, 436, and 442 of FIG. 5 can each be as described with reference to arrow 408 of FIG. 5.

As illustrated by arrow 410 of FIG. 5, the second wireless device 204 may transmit a request for information about the incident to the base station 100. The base station 100 can thus receive the request for information from the second wireless device 204. As illustrated by arrow 414 of FIG. 4, the base station 100 may initiate transmission of a response message towards the second wireless device 204. The transmission of the response message can be performed in response to the request message as described with reference to arrow 410 of FIG. 5. Therefore, as described with reference to arrows 408, 412 and 414 of FIG. 5, the base station can route communications between the BA 200 and the second wireless device 204 (e.g. from the BA 200 to the second wireless device 204).

As illustrated by block 416 of FIG. 5, the second wireless device 204 can configure incident information. As described herein, the incident information may comprise information indicative of a configuration the incident (e.g. an identifier of the incident). The second wireless device 204 may perform the configuration of incident information in response to a (e.g. user) input. In these examples, a user of the second wireless device 204 is able to configure (e.g. generate and/or alter) incident information via the second wireless device 204. As illustrated by arrow 420 of FIG. 5, the second wireless device 204 may transmit the incident information towards the base station 100 via the second connection. The base station 100 may thus receive the incident information from the second wireless device 204 via the second connection.

Although not illustrated in FIG. 5, some or all of the incident information received by the base station 100 can be transmitted (e.g. forwarded) to the BA 200. In this way, the base station 100 enables the second wireless device 204 to communicate with the BA 200 and, for example, provide one or more of information, commands, alerts, notifications, etc. to the BA 200.

The steps corresponding to arrows 422 and 434 of FIG. 5 can be as described with reference to arrow 410 of FIG. 5. The steps corresponding to arrows 426 and 438 of FIG. 5 can be as described with reference to arrow 414 of FIG. 5 respectively.

The steps corresponding to blocks 428 and 440 of FIG. 5 can be as described with reference to block 416 of FIG. 5, with the exception of the type of incident information being configured. For example, as illustrated by block 428 of FIG. 5, the configuration of incident information may comprise adding a member of personnel (e.g. a fire fighter) to a (e.g. existing) group (team). In some examples, as illustrated by block 440, the configuration of incident information may comprise creating a new group (team) of personnel.

The steps corresponding to arrows 432 and 444 of FIG. 5 can be as described with reference to arrow 420 of FIG. 5.

There is also provided a computer program embodied on a non-transitory machine-readable medium. The non-transitory machine-readable medium comprises instructions. The instructions are executable such that, on execution by a suitable computer or processor, the computer or processor is caused to perform the method described herein. The non-transitory machine-readable medium may be, for example, any entity or device capable of carrying the computer program product. For example, the non-transitory machine-readable medium may include a data storage, such as a ROM (such as a CD-ROM or a semiconductor ROM) or a magnetic recording medium (such as a hard disk). Furthermore, the non-transitory machine-readable medium may be a transmissible carrier, such as an electric or optical signal, which may be conveyed via electric or optical cable or by radio or other means. When the computer program product is embodied in such a signal, the non-transitory machine-readable medium may be constituted by such a cable or other device or means. Alternatively, the non-transitory machine-readable medium may be an integrated circuit in which the computer program product is embedded, the integrated circuit being adapted to perform, or used in the performance of, the method described herein.

The techniques described herein facilitate recovery of incident related information in the event that a wireless device (e.g. being used to control the incident) becomes unavailable. For example, in the event that a wireless device suffers a malfunction, or becomes inoperable, the techniques enable the recovery of active incident session information (e.g. such as team configuration) on a different wireless device. In this way, the techniques described herein avoid the need to (e.g. manually) re-configure an active incident on a different wireless device. As a result, user distractions are reduced (e.g. and can be more usefully focussed on control of the incident), latency in the recovery process is reduced, and the incident can be controlled without significant interruption in the event of an error (e.g. in the network).

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for handling incident information in a network, wherein the incident information is associated with an emergency response incident, the method comprising:
- at a base station of the network:
  - establishing a first connection between the base station and a first wireless device;
  - establishing a connection between the base station and a wearable breathing apparatus configured to send one or more communications to the base station;
  - receiving the incident information from the first wireless device via the first connection;
  - determining an error of the first connection; and
  - in response to determining the error of the first connection:
    - releasing the first connection;
    - identifying a second wireless device of the network that is configured to receive the incident information; and
    - establishing a second connection between the base station and the second wireless device.

2. The method of claim 1, wherein:
- the error of the first connection is determined to have occurred if a first period of time has elapsed in which no communication is received from the first wireless device.

3. The method of claim 1, wherein releasing the first connection comprises:
- releasing a media access control address associated with the first wireless device.

4. The method of claim 1, wherein identifying the second wireless device comprises:
- receiving, from the second wireless device, a request for information indicative of a status of the incident.

5. The method of claim 1, further comprising:
- initiating transmission of the incident information towards the second wireless device via the second connection.

6. The method of claim 5, wherein initiating transmission of the incident information towards the second wireless device comprises:
- initiating transmission of the incident information in response to a request received from the second wireless device.

7. The method of claim 1, wherein the base station is configured to, at any one point in time, maintain a connection with only one of the first wireless device and the second wireless device.

8. The method of claim 1, wherein the incident information comprises one or more of:
- a start time of the incident;
- a location of the incident;
- an identifier associated with the first wireless device;
- an identifier indicative of an identity of a wearer of the breathing apparatus;
- a status of the wearer of the breathing apparatus; and
- measurement information associated with the breathing apparatus.

9. The method of claim 1, wherein:
- the first wireless device and the second wireless device are different.

10. The method of claim 1, wherein at least one of the first wireless device and the second wireless device comprises a display, the method comprising:
- causing, via the display, output of a user interface comprising at least a portion of the incident information.

11. The method of claim 1, wherein:
- the network is a radio network.

12. The method of claim 1, wherein the breathing apparatus is a self- contained breathing apparatus, the method further comprising:
- receiving, from the breathing apparatus and via the connection between the base station and the breathing apparatus, telemetry information.

13. A base station comprising:
- processing circuitry; and
- memory storing instructions that, when executed by the processing circuitry, configure the base station to:
  - establish a first connection between the base station and a first wireless device of a network;
  - establish a connection between the base station and a wearable breathing apparatus configured to send one or more communications to the base station;
  - receive incident information from the first wireless device via the first connection, wherein the incident information is associated with an emergency response incident;
  - determine an error of the first connection; and in response to determining the error of the first connection:

release the first connection;

identify a second wireless device of the network that is configured to receive the incident information; and establish a second connection between the base station and the second wireless device.

14. The base station of claim 13, wherein the instructions, when executed by the processing circuitry, configure the base station to determine the error of the first connection if a first period of time has elapsed in which no communication is received from the first wireless device.

15. The base station of claim 13, wherein the instructions, when executed by the processing circuitry, further configure the base station to:

initiate transmission of the incident information towards the second wireless device via the second connection.

16. The base station of claim 13, wherein at least one of the first wireless device and the second wireless device comprises a display, and wherein the instructions, when executed by the processing circuitry, further configure the base station to:

cause, via the display, output of a user interface comprising at least a portion of the incident information.

17. A computer program product, embodied on a non-transitory machine-readable medium, comprising instructions which are executable by processing circuitry to cause:

establishing a first connection between a base station and a first wireless device of a network;

establishing a connection between the base station and a wearable breathing apparatus configured to send one or more communications to the base station;

receiving incident information from the first wireless device via the first connection;

determining an error of the first connection; and in response to determining the error of the first connection:

releasing the first connection;

identifying a second wireless device of the network that is configured to receive the incident information; and establishing a second connection between the base station and the second wireless device.

18. The computer program product of claim 17, wherein the instructions, when executed by the processing circuitry, cause the determining the error of the first connection if a first period of time has elapsed in which no communication is received from the first wireless device.

19. The computer program product of claim 17, wherein the instructions are executable by the processing circuitry to further cause:

initiating transmission of the incident information towards the second wireless device via the second connection.

20. The computer program product of claim 17, wherein at least one of the first wireless device and the second wireless device comprises a display, and wherein the instructions are executable by the processing circuitry to further cause:

causing, via the display, output of a user interface comprising at least a portion of the incident information.

* * * * *